United States Patent
De Dreuille et al.

(10) Patent No.: US 12,552,068 B2
(45) Date of Patent: Feb. 17, 2026

(54) METHOD OF MAKING AN OBJECT FROM PLYWOOD

(71) Applicants: Jean De Dreuille, Paris (FR); Come De Dreuille, Paris (FR); Alban De Dreuille, Paris (FR); Eloi De Dreuille, Paris (FR)

(72) Inventors: Jean De Dreuille, Paris (FR); Come De Dreuille, Paris (FR); Alban De Dreuille, Paris (FR); Eloi De Dreuille, Paris (FR)

( * ) Notice: Subject to any disclaimer, the term of this patent is extended or adjusted under 35 U.S.C. 154(b) by 115 days.

(21) Appl. No.: 18/331,996

(22) Filed: Jun. 9, 2023

(65) Prior Publication Data
US 2023/0398713 A1    Dec. 14, 2023

(51) Int. Cl.
| | | |
|---|---|---|
| *B27M 3/00* | (2006.01) | |
| *B27M 1/02* | (2006.01) | |
| *B27M 1/08* | (2006.01) | |

(52) U.S. Cl.
CPC ............ *B27M 3/0053* (2013.01); *B27M 1/02* (2013.01); *B27M 1/08* (2013.01)

(58) Field of Classification Search
CPC .... B27M 3/0053; B27M 3/0026; B27M 1/02; B27M 1/08
See application file for complete search history.

(56) References Cited

U.S. PATENT DOCUMENTS 2,573,465 A * 10/1951 Lundberg ................ B27D 1/06
144/349

FOREIGN PATENT DOCUMENTS

| EP | 0869014 A1 | 10/1998 |
| EP | 2295215 A1 | 3/2011 |
| FR | 3022270 A1 | 6/2014 |
| WO | 2006005209 A1 | 1/2006 |

OTHER PUBLICATIONS

European Search Report from corresponding European Application No. EP 22178398, dated Nov. 25, 2022.

* cited by examiner

*Primary Examiner* — Daniel McNally
(74) *Attorney, Agent, or Firm* — Sandberg Phoenix & von Gontard, P.C.

(57) ABSTRACT

A method of manufacturing a curved shaped object formed primarily of plywood, the method comprising: cutting strips from a plywood panel; and arranging and bending the strips in two different directions. The strips can have edges that have a wavy profile. The strips can be arranged in a multi-layer stack where they are staggered or crossed. The object is at least partially ovoid in shape.

15 Claims, 5 Drawing Sheets

METHOD OF MAKING AN OBJECT FROM PLYWOOD

CROSS-REFERENCE TO RELATED APPLICATIONS

This application claims the benefit, under 35 U.S.C. § 119, of EP 22178398.8 filed on Jun. 10, 2022, the disclosure of which is incorporated herein by reference in its entirety.

FIELD

The invention relates to the field of manufacturing of plywood objects and in particular curved objects.

BACKGROUND

Manufacturing curved objects in solid wood is not recent since the manufacture of barrels or ship hulls has been known and mastered for several centuries. Solid wood has the advantage of being mechanically stable and can be sanded and well maintained. It is therefore robust and durable. Solid wood has however the disadvantage of being expensive. Also, bending solid wood requires heating the wood and this does not simplify the manufacturing with solid wood.

Plywood is often used in lieu of solid wood for many applications and its main advantage is its cost. Bendable plywood is a plywood with an odd number (usually 3) of layers of overlapping veneers, with the middle layer being thinner than the two outer layers. This structure gives the bendable plywood a flexibility allowing to make shapes that are curved around one axis (mathematically, these shapes are "ruled surfaces" made from parallel straight lines). The preferred axis of bending is generally parallel to the grain of the wood. Thus, in addition to the fact that bendable plywood is less robust than solid wood, the disadvantage of bendable plywood is that it can only be bent around one axis. The variety of shapes that can be obtained by working a plywood panel is therefore limited.

SUMMARY

The invention proposes a process for manufacturing curved wooden objects that is less expensive than processes involving solid wood, yet still ensuring good strength of the object thus obtained.

The invention relates to a method of manufacturing an object of curved shape formed primarily of bendable plywood, the method comprising: cutting a plurality of strips from a bendable plywood panel, the strips having an edge with a corrugated or wavy profile; forming a first layer of strips of the plurality of strips, wherein the first layer comprises strips arranged in pairwise contact such that the corrugated or wavy profile of a strip of the plurality strips of the first layer engages the corrugated or wavy profile of an adjacent strip of the plurality of strips of the first layer; and pressurizing the layer of strips to bend each of the strips of the first layer around two different directions.

By "strip" is meant a generally elongated shape having a width much less than its length, for example at least 5 times less or at least 10 times less. Such a cutting process enables a strip to be bendable in two directions (in contrast to the whole plywood panel). The strip is designed so that its length is parallel to the preferred axis of bending (i.e., according to the grain of the wood) and its width is perpendicular to the preferred axis of bending. Bending the width around the longitudinal axis of the strip is easy because it corresponds to the natural bending of bendable plywood. Bending around another axis (e.g., perpendicular to the length of the strip) is made possible by the flexibility of the strip obtained by a sufficient length/width ratio (at least 5).

Thus, the strip can be bent about a first axis which can be an axis parallel to the length of the strip, and (simultaneously, before or after) about a second axis which can be an axis parallel to the width of the strip.

Thus, the two bending directions can be secant or even perpendicular.

Once pressurized, the strip layer can be self-supporting by construction or can be held together by gluing.

The use of bendable plywood thus has the dual benefit of facilitating flexibility (versatility of the design) while providing a strong end product. A single layer of veneer could not provide this rigidity because the wood would tend to tear along the grain.

By "edge with a corrugated or wavy profile", it is intended to mean that corrugations are visible on the edge of the strip, seen from a direction that is perpendicular to the face of the strip.

The "contact" between two adjacent strips of the layer is done by contacting the two edges of the two adjacent strips, i.e., one edge of a strip is in contact with the edge of the adjacent strip.

According to an exemplary embodiment, the method further comprises forming a second layer of strips of the plurality of strips, wherein the second layer comprises strips arranged in pairwise contact such that the corrugated or wavy profile of a strip of the plurality strips of the second layer engages the corrugated or wavy profile of an adjacent strip of the plurality of strips of the second layer; and superimposing the second layer on the first layer. The superimposition of layers increases the mechanical resistance of the object.

According to an exemplary embodiment, each strip of the first layer and each strip of the second layer have a respective main direction, and superimposing the second layer on the first layer comprises superimposing the second layer on the first layer such that the main directions of the strips of the first layer are perpendicular or oblique with respect to the main directions of the strips of the second layer.

According to an exemplary embodiment, superimposing the second layer on the first layer comprises superimposing the second layer on the first layer such that the strips of the first layer are arranged in a staggered manner with respect to the strips of the second layer.

According to an exemplary embodiment, the method further comprises interposing a fabric layer between the first and the second layer. The fabric can have properties such as thermal insulator, acoustic insulator, electromagnetic insulator. The fabric can also reinforce the adhesion between the layers of plywood.

According to an exemplary embodiment, the method further comprises forming an intermediate layer of strips and interposing the intermediate layer of strips between the first layer and the second layer, in such a manner that at least two of the strips of the intermediate layer are separated from each other by a gap. This gap enables the insertion of cables or pipes that would be hidden within the object.

Three layers (first, second and intermediate) is an example of number of layers which can be superimposed. Three is a good trade-off between weight/strength and cost but additional layers can also be added to reinforce further the object.

According to an exemplary embodiment, the method further comprises interposing a fabric layer between the intermediate layer and the first layer, and/or between the intermediate layer and the second layer.

According to an exemplary embodiment, the corrugated or wavy profile of the strips are dovetails. In comparison with strips having straight edges, the dovetails (or puzzle shapes) enable to reinforce the strength of the strips once they are assembled together.

According to an exemplary embodiment, the strips, the first layer and the two different directions are such that during pressurizing, the object has a generally ovoid shape. The layers can extend over 360°, or less. The object can thus present the shape of an egg.

According to an exemplary embodiment, the strips, the first layer and the two different directions are such that during pressurizing, the object has recesses. These recess result from the initial shape of the strips.

According to an exemplary embodiment, the ovoid shape has at least one pole and the strips have at least one a tapered end, so as to form, together when they are pressurized, the pole.

According to an exemplary embodiment, the strips can be glued together and/or the layers can be glued together, by gluing under vacuum or by pressurized gluing. In various embodiments a sustainable glue is used.

Alternatively, the strips can have a straight or curved profile (non-corrugated).

The invention further relates to a piece of furniture comprising a first curved element made of bendable plywood strips and obtained by: cutting a plurality of strips from a bendable plywood panel, the strips having an edge with a corrugated or wavy profile; forming a first layer of strips of the plurality of strips, wherein the first layer comprises strips arranged in pairwise contact such that the corrugated or wavy profile of a strip of the plurality strips of the first layer engages the corrugated or wavy profile of an adjacent strip of the plurality of strips of the first layer; and pressurizing the layer of strips to bend each of the strips of the first layer around two different directions.

The piece of furniture can be an alcove enabling an individual to comfortably and peacefully isolate him/herself from the surroundings.

According to an exemplary embodiment, the piece of furniture further comprises a second curved element made of bendable plywood strips and obtained by: cutting a plurality of strips from a bendable plywood panel, the strips having an edge with a corrugated or wavy profile; forming a first layer of strips of the plurality of strips, wherein the first layer comprises strips arranged in pairwise contact such that the corrugated or wavy profile of a strip of the plurality strips of the first layer engages the corrugated or wavy profile of an adjacent strip of the plurality of strips of the first layer; and pressurizing the layer of strips to bend each of the strips of the first layer around two different directions, wherein the first curved element and the second curved element are of generally ovoid shape and the first curved element is encapsulated in the second curved element.

The invention also relates to a mold for manufacturing a naval part, an aeronautical part or a boiler making part, the mold being manufactured by: cutting a plurality of strips from a bendable plywood panel, the strips having an edge with a corrugated or wavy profile; forming a first layer of strips of the plurality of strips, wherein the first layer comprises strips arranged in pairwise contact such that the corrugated or wavy profile of a strip of the plurality strips of the first layer engages the corrugated or wavy profile of an adjacent strip of the plurality of strips of the first layer; and pressurizing the layer of strips to bend each of the strips of the first layer around two different directions.

The invention has a number of advantages. First, it allows the manufacture of objects with complex shapes at reduced cost without compromising their robustness. Secondly, the process can be easily applied for prototypes or small series, as well as for large series.

DRAWINGS

Figure 10:
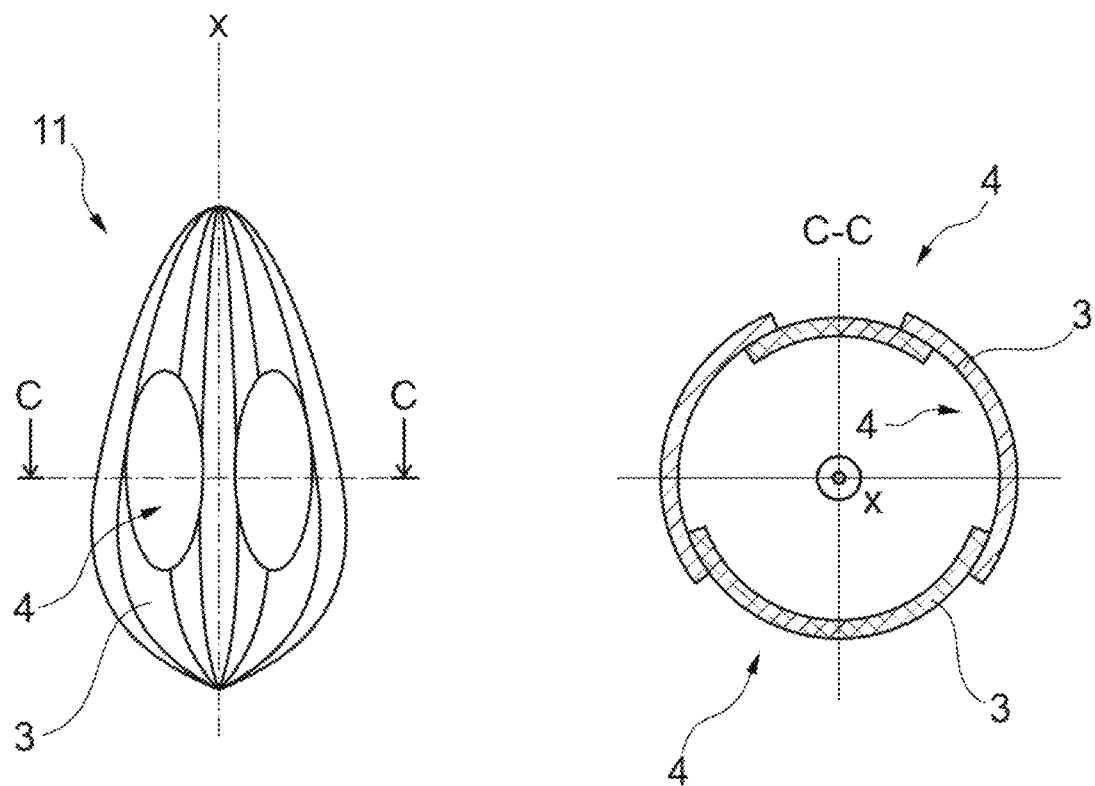

FIG. 10 describes a piece of furniture in accordance with various embodiments of the invention.

DETAILED DESCRIPTION

The figures are shown schematically. Some dimensions can be exaggerated for ease of understanding.

Figure 1:
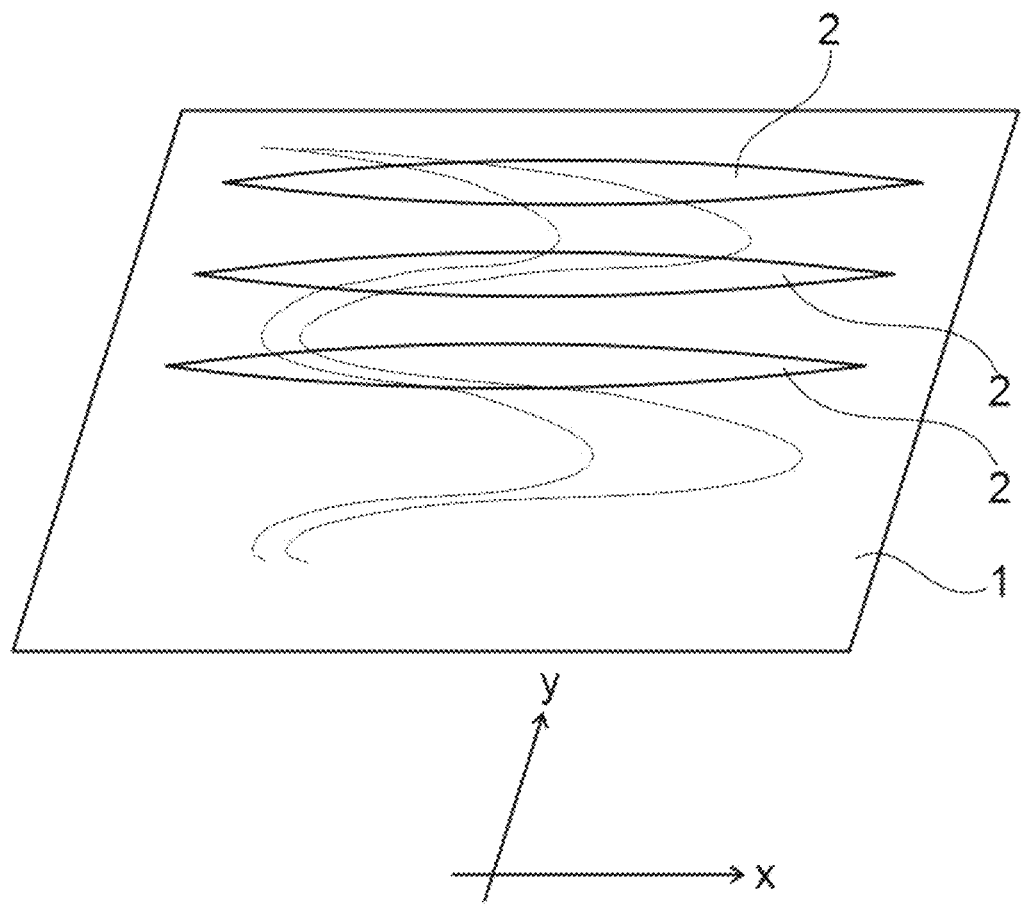
FIG. 1 is an isometric view of a plywood panel in accordance with various embodiments of the invention.

FIG. 1 shows a bendable plywood panel 1. The direction of the wood grain is noted X and axis Y is perpendicular to X.

Strips 2 are cut from the panel 1. The strips are generally elongated in shape having a width perpendicular to the grain and a length along the grain direction. The length can be at least 5, at least 10, at least 20 or at least 30 times the width.

Like the examples given below, each strip 2 has a particular shape, designed to form a part of an object. The strips are designed so as to together for a given object (by "reverse engineering" developing the final shape of the object and projecting it).

Figure 2:
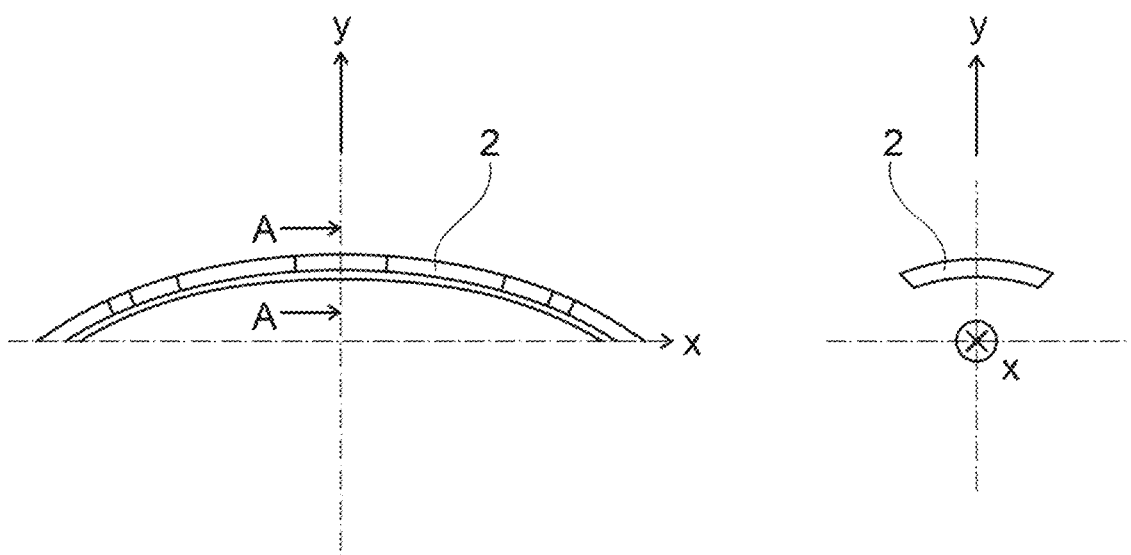
FIG. 2 shows a strip cut from the panel of FIG. 1 and bent along two axes in accordance with various embodiments of the invention.

FIG. 2 shows a strip 2 that has been bent around both the X and Y axes. In this example, the axes are perpendicular to one another, but other configurations are possible for bending the strips along two intersecting non-perpendicular axes. The form factor of the strip and the fact that it is cut in the direction of the grain are advantageous in this ability to bend the strip in both directions.

The right part of FIG. 2 shows the section A-A that is labeled on the left part.

Figure 3:
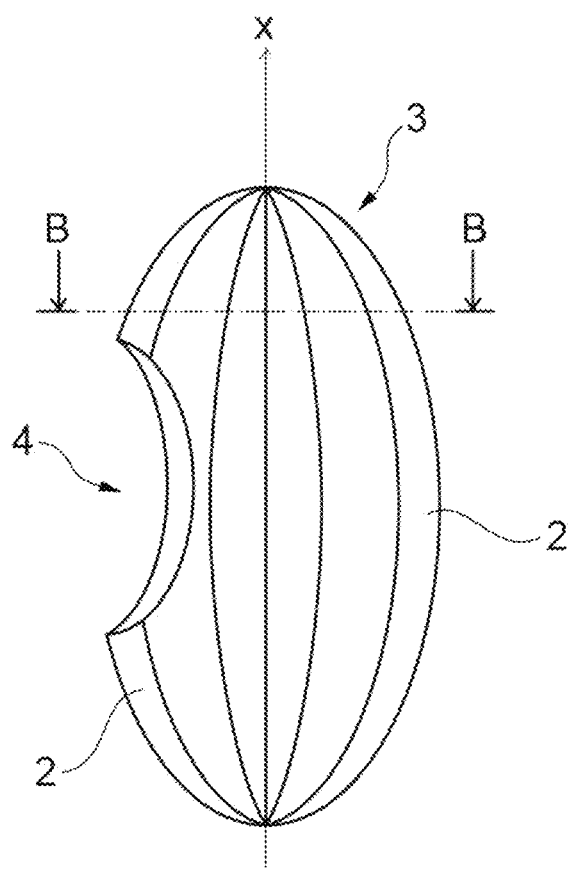
FIG. 3 shows an example of an object obtained by the assembly of strips in accordance with various embodiments of the invention.

FIG. 3 shows an example of an object 3 obtained by assembling strips 2. This object can be generally axisymmetric in shape, about an axis that is shown here as the longitudinal X axis of the strips. The object 3 can include recesses or windows 4 that are foreseen in the initial shape of the strips (or alternatively cut of the object later on).

Figure 4:
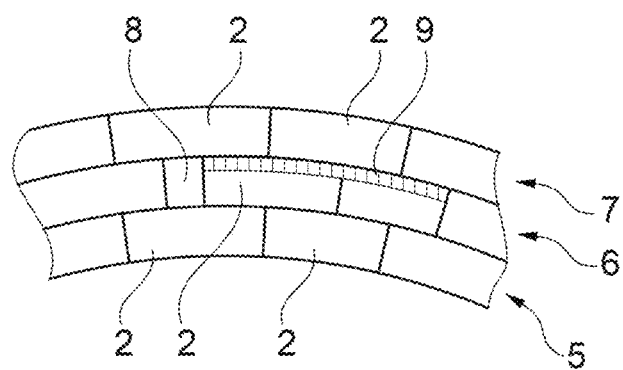
FIG. 4 shows a partial sectional view of the object in accordance with various embodiments of the invention.

FIG. 4 shows a partial section B-B as identified in FIG. 3. The wall of the object 3 can indeed be formed of several layers of strips 2 as for example here the three layers 5, 6, 7. An intermediate layer 6 can be arranged between an inner layer 5 and an outer layer 7. The strips 2 are arranged in a staggered pattern from one layer to the next.

On the intermediate layer 6, gaps 8 can be provided to ensure certain functions related to the object 3. For example, electrical conductors can be "hidden" in these gaps so that they are not visible from the outside. Other functions, cables or pipes can occupy these interstices.

In some locations, fabrics 9 can be inserted between two layers. These fabrics can have pre-defined functions, such as improving the acoustic insulation, thermal or electro-magnetic insulation, ensuring a sealing function or reinforcing the mechanical strength. When the fabric 9 does not extend along/over the entirety of a layer 5, 6, 7, the strips 2 to which the fabric 9 is applied can be of lesser thickness (to compensate the thickness of the fabric).

The strips 2 can be joined to each other, edge to edge.

A decorative veneer layer (not shown) can be superimposed on the structural layers 5, 6, 7.

Figure 5:
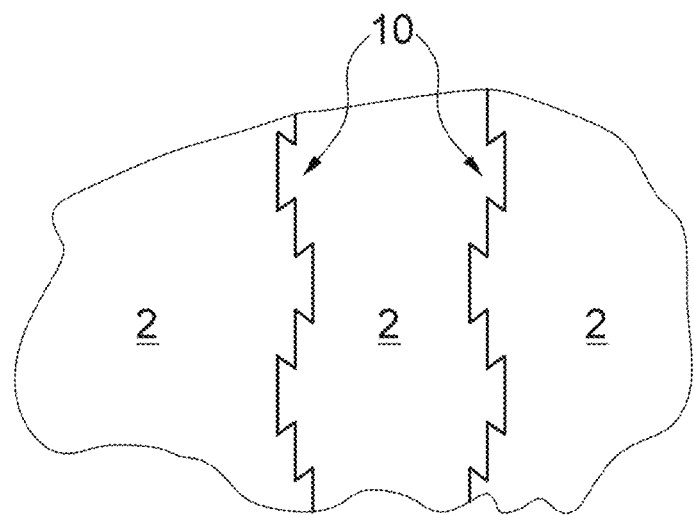
FIG. 5 shows an example of edge profiles of the strips in accordance with various embodiments of the invention.

FIG. 5 shows an embodiment in which the edges 10 have more complex profiles than a simple straight line or curved line. The edges 10 can have a wavy profile. By "wavy" is meant a repetition of waves, crenulations, corrugation, etc., or as shown here dovetails or "puzzle" shapes. The profile of one strip is complementary to that of an adjacent strip.

It is understood that the profiles can be of the same type for all the strips of the object or of different types, especially depending on the shape of the object and the mechanical stresses that must be supported at the interface between two adjacent strips. The corrugated/wavy profiles have the dual benefit of facilitating the assembly of the strips to each other by holding them together during the manufacturing of the object, and increasing their robustness once the assembly is completed.

Figure 6:
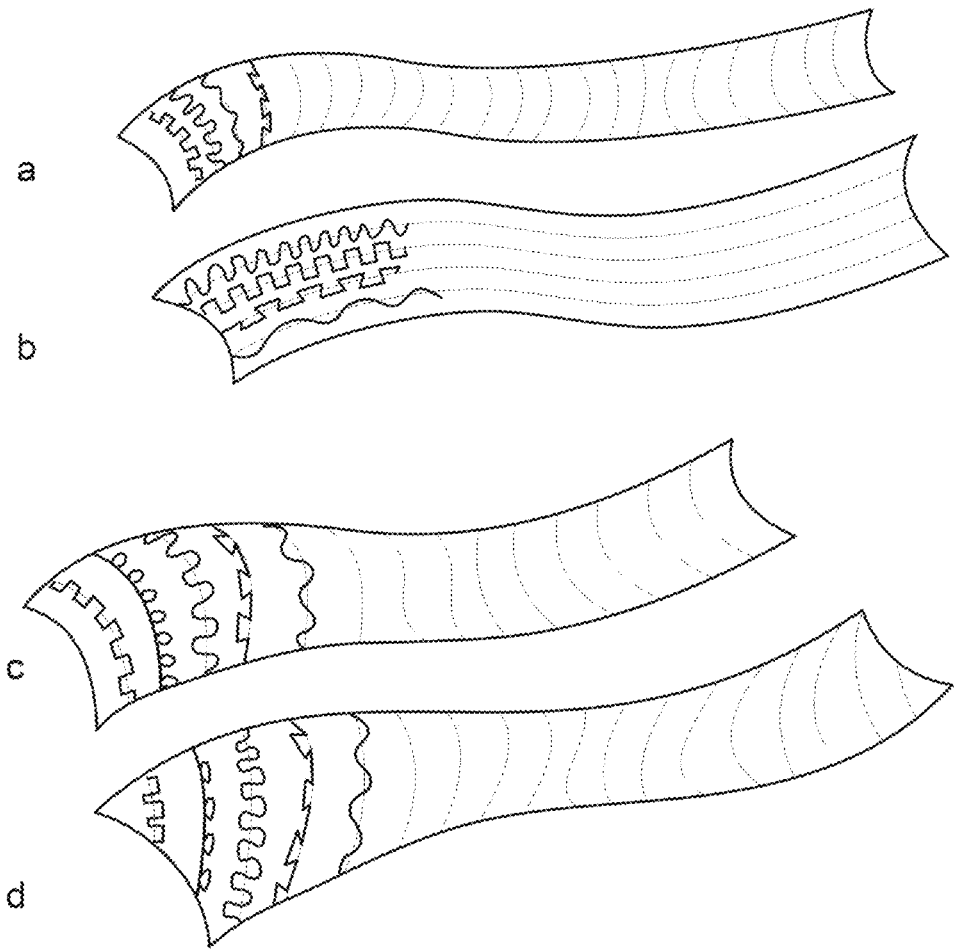
FIG. 6 shows some examples of strip arrangements in accordance with various embodiments of the invention.

FIG. 6 shows four examples (a, b, c, d) of strip assemblies with corrugated profiles. Depending on the direction of the panel grain and the final shape to be obtained, the strips are cut in one direction or the other.

The strips can be placed on a support frame and with such an arrangement, a simple longitudinal pressure (e.g., compression from the right-hand side and the left-hand side of FIG. 6) allows the assembly to be curved in accordance with the desired final shape. This compression direction can correspond to the X direction in FIG. 3.

The curved shape in two directions of space can then be self-retaining by wedging or held by bonding.

When multiple layers are superimposed, the layers can be bent simultaneously, or sequentially.

The strips of one layer can cross the direction of the strips of another layer (e.g., a layer a is superimposed on a layer b or d). Alternatively, or additionally to achieve the same object, two layers a or two layers b can be superimposed, the strips being positioned in a staggered pattern to avoid the superimposition of two joints of strips one onto another.

Figure 7:
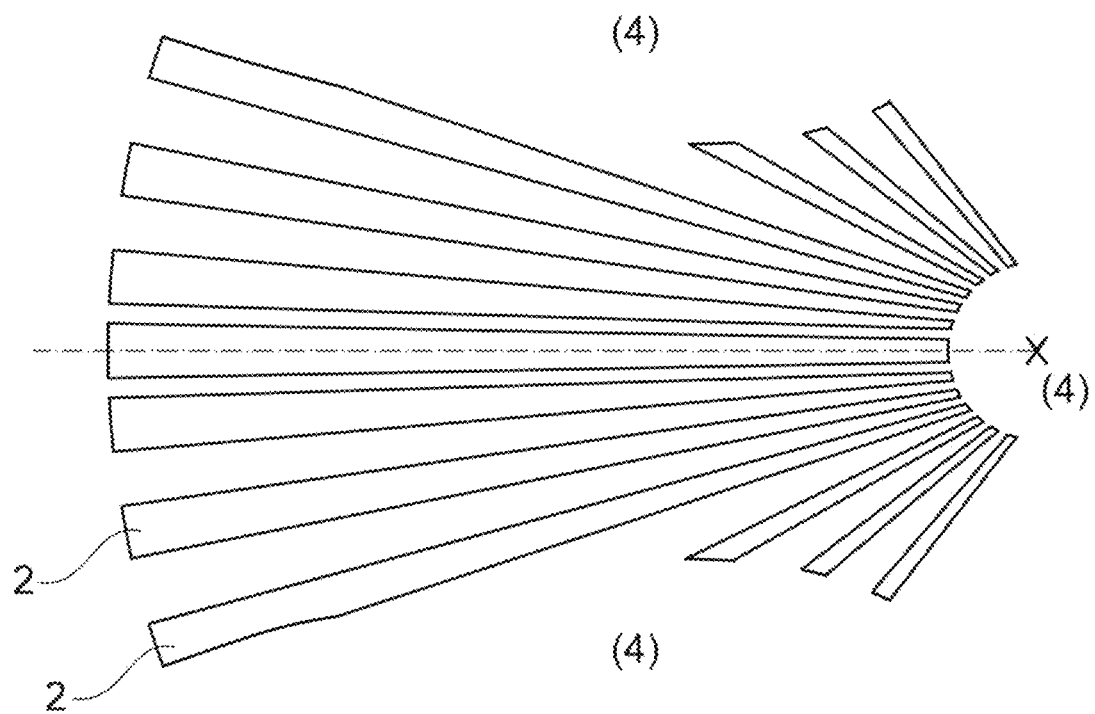
FIG. 7 shows another example of strip shapes in accordance with various embodiments of the invention.
Figure 8:
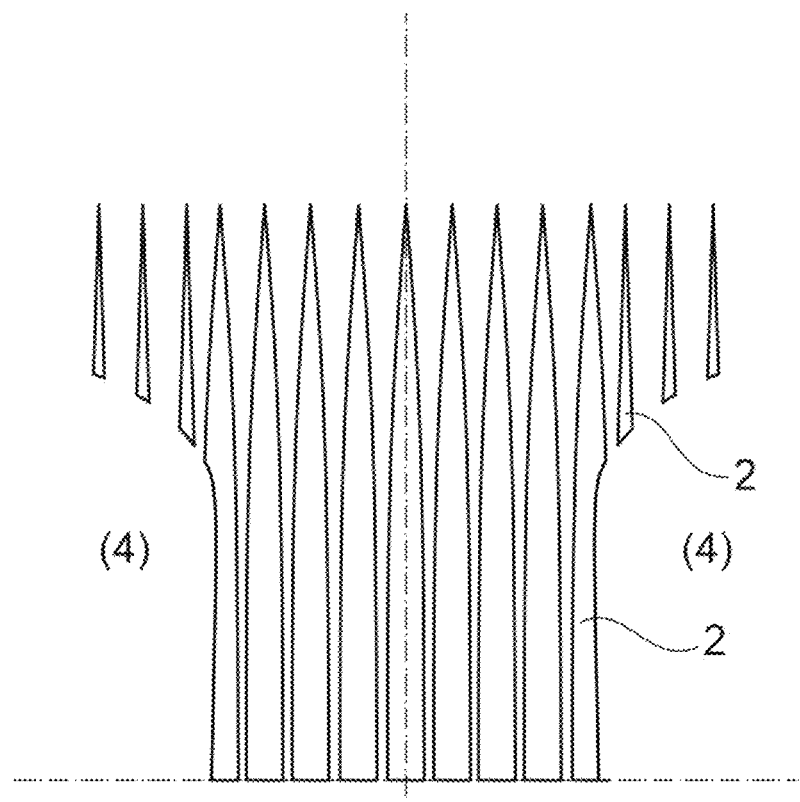
FIG. 8 shows an additional example of strip shapes in accordance with various embodiments of the invention.

FIGS. 7 and 8 show other examples of strip shapes, intended to be assembled to make the egg-shaped object 3 of FIG. 3 with recesses 4. These figures show the strips 2 already cut (they are arranged differently on the plywood panel 1 where their lengths are along the direction of the grain).

Figure 9:
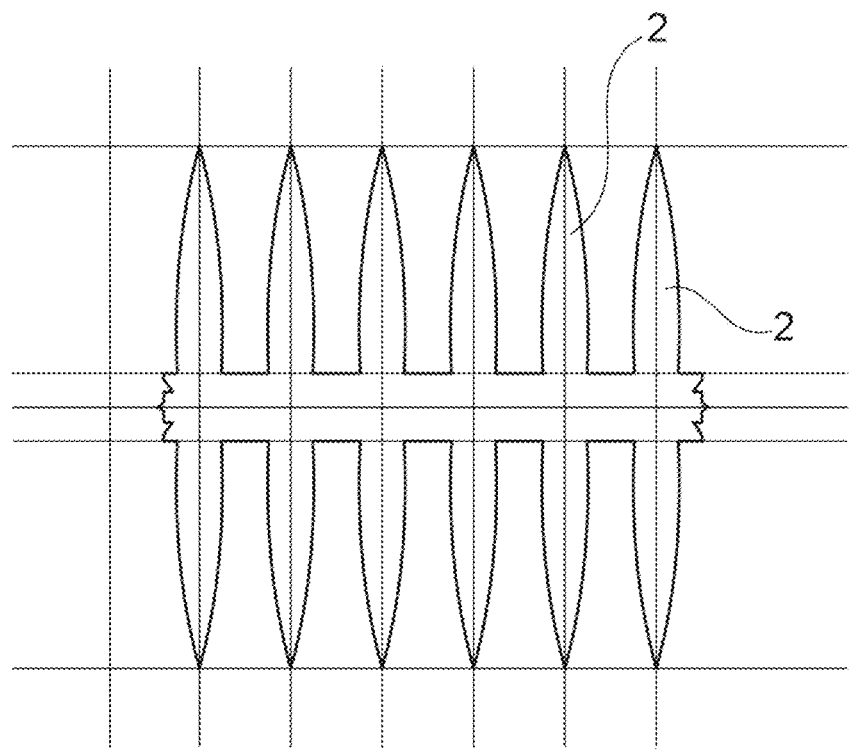
FIG. 9 shows another example of strip shapes in accordance with various embodiments of the invention.

FIG. 9 shows an example where the strips are joined by a central part during their cutting.

This type of cutting can facilitate the handling of the strips, without hindering their flexibility in both bending directions (horizontal and vertical directions in FIG. 9).

FIG. 10 shows a possible application of the process according to the invention. A piece of furniture 11 is composed (see section C-C on the right of the figure) of two egg-shaped elements 3 nested within each other. The piece 11 can be of a size sufficient to accommodate an adult. It can include a chair and possibly a desk. One of the two elements 3 pivots around the axis X. Since both elements have recesses, by pivoting one of the two elements 3, the recesses can be brought into alignment to allow the furniture piece to be opened and accessed.

Conversely, when the recesses of the two elements 3 are not facing each other, a person can be isolated inside the egg.

The piece of furniture 11 can have the general shape of the registered design USD765876, although the herewith claimed piece of furniture is distinct at a closer scale and shows the assembled strips with their corrugated or wavy profiles.

The method for designing the shape of the strips is as follows: a given object is first modeled in a CAD software; parameters are given to cut the virtual object into strips (e.g., criteria for maximum strip width, number of strips, or width/length ratio); the virtually cut strips are then planarized (developed on a plane) to obtain an outline for each strip; the outlines can then be reproduced/printed on a plywood panel, or directly fed to a CNC wood cutting machine; the strips can thus be cut from a plywood panel.

In addition to the applications mentioned above, the manufacturing process of the invention can be used to manufacture molds for the production of parts curved along several axes (in particular to obtain an ovoid shape as described above). These applications include molds for ship hulls, blades, vanes, or other aeronautical parts, fiberglass objects, sporting goods, boiler making parts, etc.

The invention claimed is:

1. A method of manufacturing an object of curved shape formed primarily of bendable plywood, said method comprising:
   cutting a plurality of strips from a bendable plywood panel, the strips having an edge with a corrugated or wavy profile;
   forming a first layer of strips of the plurality of strips, wherein the first layer comprises strips arranged in pairwise contact such that the corrugated or wavy profile of a strip of the plurality strips of the first layer engages the corrugated or wavy profile of an adjacent strip of the plurality of strips of the first layer; and
   pressurizing the layer of strips to bend each of the strips of the first layer around two different directions.

2. The method according to claim 1, further comprising:
   forming a second layer of strips of the plurality of strips, wherein the second layer comprises strips arranged in pairwise contact such that the corrugated or wavy profile of a strip of the plurality strips of the second layer engages the corrugated or wavy profile of an adjacent strip of the plurality of strips of the second layer; and
   superimposing the second layer on the first layer.

3. The method according to claim 2, further comprising forming an intermediate layer of strips and interposing the intermediate layer of strips between the first layer and the second layer, in such a manner that at least two of the strips of the intermediate layer are separated from each other by a gap.

4. The method according to claim 3, further comprising interposing a fabric layer between the intermediate layer and the first layer, and/or between the intermediate layer and the second layer.

5. The method according to claim 2, wherein each strip of the first layer and each strip of the second layer have a respective main direction, and superimposing the second layer on the first layer comprises superimposing the second layer on the first layer such that the main directions of the strips of the first layer are perpendicular or oblique with respect to the main directions of the strips of the second layer.

6. The method according to claim 2, wherein superimposing the second layer on the first layer comprises superimposing the second layer on the first layer such that the strips of the first layer are arranged in a staggered manner with respect to the strips of the second layer.

7. The method according to claim 2, further comprising interposing a fabric layer between the first and the second layer.

8. The method according to claim 1, wherein the corrugated or wavy profile of the strips are dovetails.

9. The method according to claim 1, wherein the strips, the first layer and the two different directions are such that during pressurizing, the object has a generally ovoid shape.

10. The method according to claim 9, wherein the ovoid shape has at least one pole and the strips have at least one a tapered end, so as to form, together when they are pressurized, the pole.

11. The method according to claim 1, wherein the strips, the first layer and the two different directions are such that during pressurizing, the object has recesses.

12. An object of curved shape formed primarily of bendable plywood, manufactured by:
    cutting a plurality of strips from a bendable plywood panel, the strips having an edge with a corrugated or wavy profile;
    forming a first layer of strips of the plurality of strips, wherein the first layer comprises strips arranged in pairwise contact such that the corrugated or wavy profile of a strip of the plurality strips of the first layer engages the corrugated or wavy profile of an adjacent strip of the plurality of strips of the first layer; and
    pressurizing the layer of strips to bend each of the strips of the first layer around two different directions.

13. The object according to claim 12, wherein the object is a piece of furniture.

14. The object according to claim 13, further comprising a second curved element made of bendable plywood strips and obtained by:
    cutting a plurality of strips from a bendable plywood panel, the strips having an edge with a corrugated or wavy profile;
    forming a first layer of strips of the plurality of strips, wherein the first layer comprises strips arranged in pairwise contact such that the corrugated or wavy profile of a strip of the plurality strips of the first layer engages the corrugated or wavy profile of an adjacent strip of the plurality of strips of the first layer; and
    pressurizing the layer of strips to bend each of the strips of the first layer around two different directions,
    wherein the first curved element and the second curved element are of generally ovoid shape and the first curved element is encapsulated in the second curved element.

15. The object according to claim 12, wherein the object is a mold for manufacturing a naval part, an aeronautical part or a boiler making part.

* * * * *